United States Patent [19]

Harpman et al.

[11] 4,114,566
[45] Sep. 19, 1978

[54] HOT FUEL GAS GENERATOR

[75] Inventors: Webster B. Harpman, Poland, Ohio; Fred G. Mahoney, Pittsburgh, Pa.

[73] Assignee: Econo Fuel Systems, Inc., Latrobe, Pa.

[21] Appl. No.: 791,407

[22] Filed: Apr. 27, 1977

Related U.S. Application Data

[63] Continuation-in-part of Ser. No. 710,195, Jul. 30, 1976, Pat. No. 4,023,538, which is a continuation-in-part of Ser. No. 625,565, Oct. 24, 1975, Pat. No. 4,050,419.

[51] Int. Cl.² .................................. F02D 19/00
[52] U.S. Cl. ................................. 123/25 B; 123/3; 123/25 P; 123/122 F; 261/18 A; 48/102 A; 48/103; 48/184
[58] Field of Search ............... 123/25 R, 25 P, 25 E, 123/25 F, 25 B, 25 D, 25 A, 121, 34 A, 133, 122 H, 3, 122 F; 261/18 A, DIG. 68; 48/102 A, 103, 184

[56] References Cited

U.S. PATENT DOCUMENTS

| | | | |
|---|---|---|---|
| 888,282 | 5/1908 | Westendarp | 123/122 E |
| 1,060,042 | 4/1913 | Wales | 123/122 F |
| 2,150,905 | 3/1939 | Belgau | 123/133 |
| 3,380,442 | 4/1968 | Johnson | 123/122 E X |
| 3,565,201 | 2/1971 | Petsinger | 123/122 E X |
| 3,728,092 | 4/1973 | Gorman, Jr. | 123/122 E X |
| 3,792,688 | 2/1974 | Grainger | 123/122 F |

Primary Examiner—Charles J. Myhre
Assistant Examiner—Ira S. Lazarus
Attorney, Agent, or Firm—Webster B. Harpman

[57] ABSTRACT

A hot fuel gas generator for an internal combustion engine simultaneously vaporizes gasoline and water in a multi-chambered heated pressure vessel having built in regulators for controlling pressure and volume and delivers the resulting superheated steam and gaseous fuel to the internal combustion engine downstream from the usual carburetor. A single device operating at a very high temperature, for example 1800° F., is used for the simultaneous vaporization of the fuel and water to develop desirable working pressure and volume. The high temperature steam and gaseous fuel positions the fuel molecules at the greatest degree of separation from each other providing the greatest opportunity for contact of the oxygen, the reacting species in the gaseous condition as chemical reactions occur only between particles at the atomic or molecular level and it is necessary for the reacting species to be in actual contact at the time of reaction. The hot fuel gas produced therefore enables complete combustion and the elimination of the atmospheric pollutants common in the operation of internal combustion engines and increases the energy obtained from the fuel.

9 Claims, 4 Drawing Figures

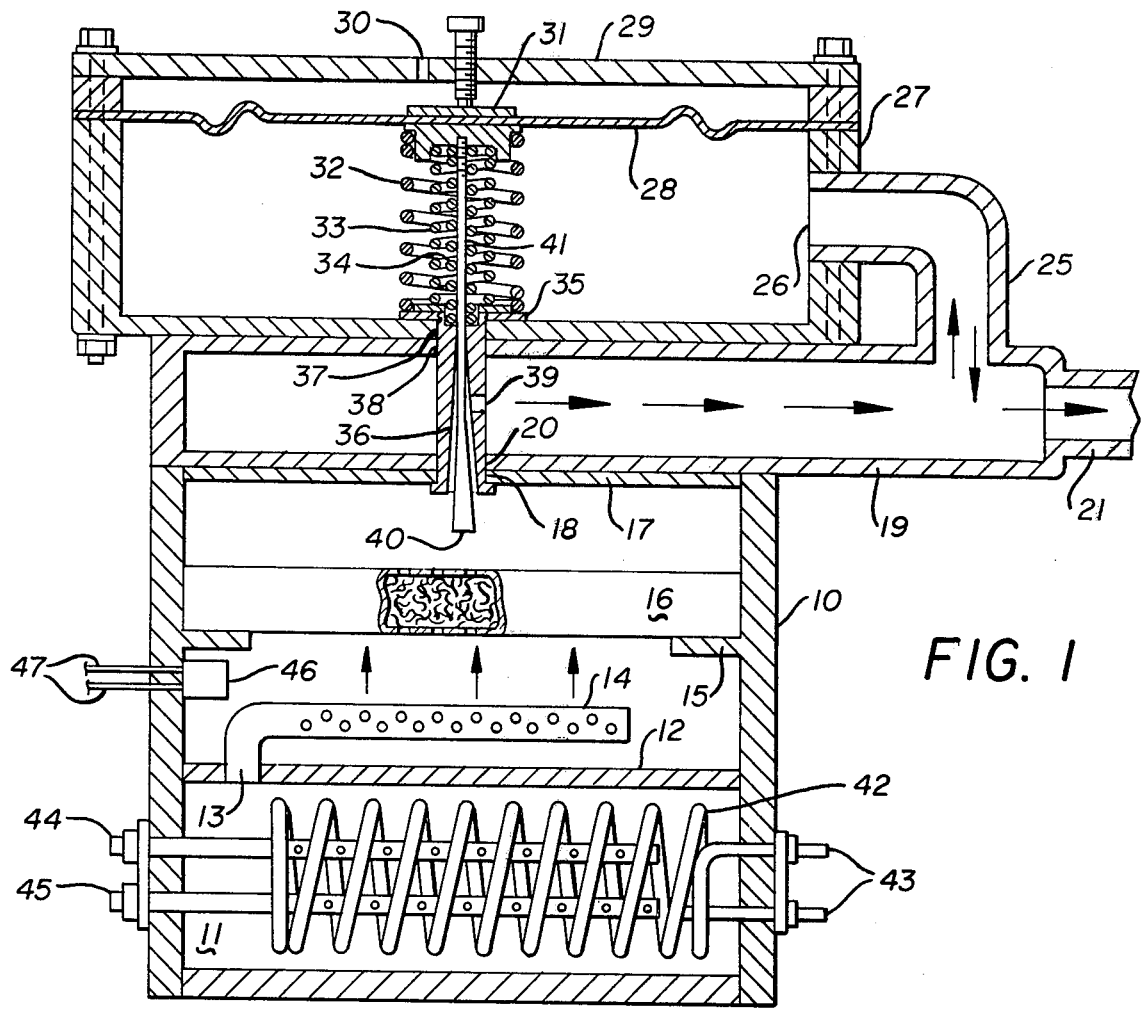
FIG. 1
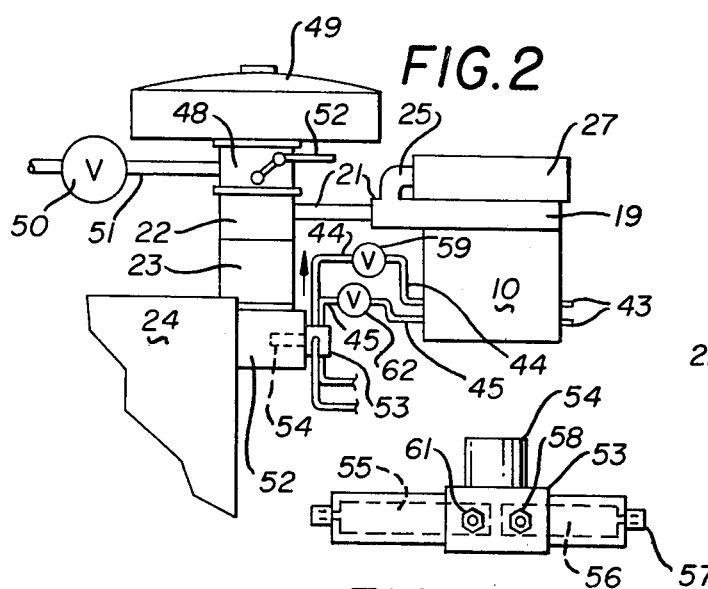
FIG. 2
FIG. 4
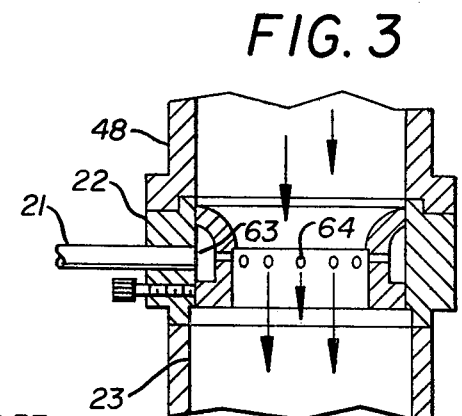
FIG. 3

HOT FUEL GAS GENERATOR

This is a continuation in part of our co-pending application Ser. No. 710,195 filed July 30, 1976, now U.S. Pat. No. 4,023,538 which was a continuation in part of Ser. No. 625,565, filed Oct. 24, 1975, now U.S. Pat. No. 4,050,419.

BACKGROUND OF THE INVENTION (1) Field of the Invention

This invention relates to fuel systems and vaporizing devices therein for internal combustion engines, and more particularly fuel gas generators.

(2) Description of the Prior Art

Fuel systems for internal combustion engines have generally used carburetors in which gasoline is sprayed into a stream of air and divided into a series of fine droplets approaching vaporization and conveyed to the point of combustion. Only those molecules at the surface of the gasoline droplets are in a position to react with another species and incomplete combustion results because the very short time allowed is insufficient for more than a little vaporization of the fuel to occur. The prior art engines therefore exhaust large quantities of unburned hydrocarbons, carbon monoxide and oxides of nitrogen all of which are undesirable atmospheric pollutants. Several attempts to improve vaporization may be seen in U.S. Pat. Nos. 1,110,482, 2,585,171, 2,285,905 and 2,272,341.

This invention simultaneously vaporizes the liquid fuel and water at very high temperatures so that the fuel mixture in its heated pressurized gaseous state achieves practically complete combustion in the internal combustion engine due to the spacing of the molecules resulting from the heat and the superheated steam.

SUMMARY OF THE INVENTION

A hot fuel gas generator having a novel high temperature and pressure controlled heated vaporizer is disclosed in which gasoline and water are simultaneously vaporized to produce a hot gaseous fuel under pressure and regulated as to temperature, volume and flow is in direct communication with the inlet manifold of the engine. The usual carburetor adds fuel for starting only and continuously controls the combustion air and regulates the same to provide throttle control. The partial vacuum resulting from the operation of the internal combustion engine moves the combustion air with the proper quantity of the hot gaseous fuel from the generator to the areas of combustion in the engine. The complete vaporization of the liquid fuel and the water is caused by high temperature heat from an external source under controlled pressure and volume conditions. Gasoline or other fuel in a ratio of 80%–90% to water 10%–20% makes a highly satisfactory hot gaseous fuel.

DESCRIPTION OF THE DRAWINGS

FIG. 1 is a cross sectional side elevation of the hot fuel gas generator;

FIG. 2 is a diagrammatic illustration of a fuel system for an internal combustion engine and incorporating the generator of FIG. 1, and FIG. 3 is a cross sectional side view of a fuel introducing fitting used in the fuel system of FIG. 2, and FIG. 4 is a side elevation of a preheater seen in FIG. 2.

DESCRIPTION OF THE PREFERRED EMBODIMENT

By referring to the drawings and FIG. 1 in particular it will be seen that the hot fuel gas generator comprises a multi-chambered pressure vessel in the form of a hollow body member generally indicated by the numeral 10, the lowermost portion of which comprises a flash vaporization chamber 11. A thin walled partition 12 apertured as at 13 divides the flash vaporization chamber 11 into upper and lower parts and a perforated tube 14 is positioned in the upper part and is in communication with the aperture 13. Supports 15 in the upper portion locate a steel wool filter 16 and the upper end of the hollow body member 10 is closed by an upper wall 17 which is centrally apertured as at 18.

A second hollow body member 19 is positioned on the upper wall 17 and has an aperture 20 registering with the aperture 18. The second hollow body 19 extends outwardly from one side of the hollow body member 10 and has a tubular extension 21 thereon which communicates with a Venturi fitting 22 positioned immediately adjacent the intake manifold 23 of an internal combustion engine 24 as best seen in FIG. 2 of the drawings. A second tubular extension 25 extends from the second hollow body 19 and communicates with an opening 26 in one side of a third hollow body 27 which forms a diaphragm case mounting a flexible diaphragm 28 thereacross spaced inwardly from an upper end closure 29 which is apertured as at 30. The center of the diaphragm 28 has a fitting 31 and three coil springs 32, 33, and 34 are positioned one within the other and against the fitting 31 and engaged at their opposite ends on the upper end of a secondary fitting 35 which has a tapered passageway 36 extending axially thereof. The secondary fitting 35 extends downwardly through openings 37 and 38 in the engaged walls of the second hollow body member 19 and the third hollow body member 27 and downwardly and through the apertures 18 and 20 in the hollow body member 10 and second hollow body member 19, as best seen in FIG. 1 of the drawings.

An opening 39 is formed in the secondary fitting 35 midway between its ends and establishes communication between the tapered passageway 36 and the interior of the second hollow body member 19. A tapered valve element 40 having a rod-like extension 41 on its upper end is movably positioned in the tapered passageway 36 which acts as a valve seat and the extension 41 is engaged in the fitting 31 on the diaphragm 28.

Still referring to FIG. 1 of the drawings, it will be seen that in the lower part of the vaporization chamber 11 a helical coiled electric resistance heating unit 42 is arranged and in electrical connection with terminals 43 extending outwardly of and insulated with respect to the wall of the hollow body member 10. The electrical resistance heating element 42 operates at a surface temperature of approximately 2000° F. and is energized by a suitable alternator, not shown, installed on the internal combustion engine with which the hot fuel gas generator is used.

A pair of supply pipes 44 and 45 extend into the vaporization chamber 11 and into the interior of the coiled heating element 42 and a series of openings in the supply pipes 44 and 45 enable water and gasoline or another hydrocarbon to be delivered into the vaporization chamber 11.

A heat and pressure responsive device 46 is located in the upper portion of the vaporization chamber 11 and terminals 47 extend through one of the walls of the hollow body member 10 and to suitable control means, not shown, which act to control the amount of water and gasoline delivered to the supply pipes 44 and 45 and to control the energization of the heating element 42.

By referring now to FIG. 2 of the drawings, it will be seen that the Venturi 22 to which the hot fuel gas generated by the hot fuel gas generator of the invention is delivered, directly communicates with the intake manifold 23 of the internal combustion engine 24 and at its upper end is in communication with a carburetor 48 equipped with the conventional air cleaner 49. A solenoid valve 50 controls a gasoline supply line 51 and a throttle linkage 52 controls the combustion air being supplied the engine 24 through the air filter 49 and the carburetor 48.

Still referring to FIG. 2 of the drawings it will be seen that the engine 24 has an exhaust manifold 53. A preheater 53 for the water and gasoline supplied the hot fuel generator is positioned on the exhaust manifold 52 with a probe 54 thereof extending into the exhaust manifold so that the heat of the engine exhaust is conveyed thereby to the preheater 53 which is preferably an integral copper body having a pair of chambers 55 and 56 therein, as may best be seen by referring to FIG. 4 of the drawings. Water is supplied to the chamber 56 through an inlet port 57 and heated water or steam emerges from the chamber 56 through an outlet port 58 which communicates with the supply pipe 44 by way of a solenoid valve 59 as seen in FIG. 2 of the drawings. Gasoline is supplied the heating chamber 55 through an inlet port 60 and heated gasoline or gasoline vapor flows out of an outlet port 61 which communicates with the supply pipe 45 by way of a solenoid valve 62.

By referring now to FIG. 3 of the drawing, a cross sectional detail of the Venturi 22 may be seen positioned between the carburetor 48 and the inlet manifold 23. Hot fuel gas from the device of the invention enters an annular chamber 63 in the Venturi by way of the tubular extension 21 of the hot fuel gas generator. Openings 64 in the adaptor ring forming the Venturi introduce the hot fuel gas into the primary combustion air.

OPERATION

Operating an internal combustion engine with the device of the invention in a fuel system as described herein requires first starting the engine with the operation of the carburetor 48 by supplying it with gasoline through the tube 51 by opening the valve 50. Simultaneously variable delivery pumps, not shown, are started as by way of an interconnecting electrical circuit not shown to supply water and gasoline or another hydrocarbon to the preheater 53 and the coiled heating element 42 is energized. The starter, not shown, is energized to move the pistons in the internal combustion engine and the air flows downwardly from the air cleaner 49 through the carburetor 48, the Venturi adaptor ring 22 and the inlet manifold 23 and the engine starts in its usual manner thus operating conventionally with the carburetor 48 which provides a rich suitable starting fuel. After a few seconds, usually from 15 to 30 seconds, the valve 50 may be closed shutting off the supply of gasoline to the carburetor 48 as by this time a suitable volume of hot fuel gas has been generated in the multiple chambered closed pressure vessel 10 and is being moved into the Venturi adaptor ring 22 by way of the tubular extension 21 so that the engine continues its operation on the hot fuel gas which is highly gasified compared to the starting mixture that had been supplied by the carburetor 48. The carburetor 48 continues its function in controlling air necessary for combustion and the usual throttle linkage 52 remains the same. The exhaust of the engine, or part of it as desired, is delivered to the exhaust manifold 52 where it rapidly heats the solid copper probe 54 of the preheater 53 and supplements the heat being supplied by the heating element 42 in the vaporization chamber of the device so as to maintain temperatures between 1600° F. to 2000° F. therein.

Delivery of the gasoline or other fuel (and kerosene operates practically as efficiently) to the vaporizaton chamber 11 results in its flash vaporization and the rapid presssurization of the hollow body 10 of the device. A build up of the pressure and volume in the hollow body member 10 extends upwardly through the tapered passageway 36 in the secondary fittings 35 and into the second hollow body member 19 which communicates directly with the Venturi device heretofore referred to. It also communicates with the diaphragm chamber formed in the third hollow body member 27 and urges the diaphragm upwardly which in turn is connected to and actuates the valve element 40 thus providing an efficient pressure and volume regulation of the hot fuel gas produced by the hot fuel gas generator. It will be observed that the diaphragm chamber within the third hollow body member 27 is also in direct communication with the tubular extension 21 and the inlet manifold by way of the Venturi 22 so that the diaphragm moves responsive to changes in the inlet manifold pressure. For example a lowering of the inlet manifold pressure flexes the diaphragm downwardly and moves the valve element 40 to a relatively larger open relation with respect to the tapered passageway 36. In practice the diaphragm 28 floats on the inlet manifold pressure responding instantaneously with respect to the changing demands of the engine as occurs with the accelerator is moved to open and close the throttle linkage. The device is able to match the fuel demand of the engine very closely and the diaphragm 28 is controlling the valve element 40 is itself controlled by the three springs 32, 33 and 34 which offer progressive resistance as the diaphragm flexes downwardly responsive to lowered inlet manifold pressure as will occur to those skilled in the art.

It will thus be seen that the hot fuel gas generator performs a number of highly desirable functions in first flash vaporizing the water and fuel and forming a super heated fuel gas which is then stored in sufficient volume and at sufficient pressure to provide for the demands of the internal combustion engine with which the device is being used. Tests of conventional automobiles and engines equipped with the hot fuel gas generator as disclosed herein show near zero levels of atmopheric pollutants in the exhaust which eliminates the need of any catalytic converter or other devices which attempt to treat the effect and not the cause. The tests also indicate a very substantial increase in the miles per gallon obtained from the hot fuel generated by the device of the invention as compared with the same amount of fuel supplied the same engine in the same vehicle through the conventional carburetor and it will be apparent to those skilled in the art that the use of the hot fuel gas generator disclosed herein will enable the automotive engineers to considerably increase the efficiency and performance of he conventional automobile engines by again increasing the compression ratio and changing the timing as the present compression ratios and timing have seriously affected performance, horse power and torque in attempting to eliminate atmospheric pollutants. Those skilled in the art will also observe that fuel additives may be used if desired although antiknocking additives are not necessary as the hot fuel gas generated by the device of the invention results in sufficiently slow burn of a highly gasified fuel including the super heated steam to avoid knocking tendencies.

Although but one embodiment of the present invention has been illustrated and described, it will be apparent to those skilled in the art that various changes and modifications may be made therein without departing from the spirit of the invention and having thus described our invention what we claim is.

We claim:

1. A generator for producing superheated fuel gas for an internal combustion engine having an intake manifold, comprising, a closed pressure vessel having partitions dividing said vessel into first, second and third chambers in side by side relation, electric resistance heating means in said first chamber, means for energizing said heating means to generate and maintain temperatures between 800° F. and 2000° F. therein, separate means for simutaneously continuously injecting predetermined amounts of gasoline and water into said first chamber against said heating means so as to simultaneously change said gasoline to a gas and said water to steam, means for controlling the energization of said heating means and the amounts of water and gasoline injected for maintaining a desirable working pressure and volume of the superheated fuel gas in said first chamber, whereby the molecules of the superheated fuel gas in its heated pressurized gaseous condition are caused to be spaced apart a sufficient degree to support substantially complete combustion in said engine, a pressure responsive device comprising an apertured tubular member positioned through said second chamber and having its ends communicating with the first and third chambers, respectively, a valve element movable relative to the end of said tubular member communicating with said first chamber, a diaphragm positioned across said third chamber, means interconnecting said valve element and said diaphragm, and means located between said diaphragm and said tubular member balancing said diaphragm and said valve element so as to permit said diaphragm to move responsive to pressure changes in said third chamber, and outlets in said second and third chambers communicating with one another and with said inlet manifold.

2. The generator for producing superheated fuel gas set forth in claim 1 wherein said apertured tubular member has a tapered bore, the tapered bore having its smaller diameter in communication with said third chamber and wherein said valve element is tapered for registry in said tapered tubular bore.

3. The generator for producing superheated fuel gas set forth in claim 1 wherein said means for controlling the energizing of the heating means and gasoline and water injection comprises a heat and pressure responsive device in said first chamber.

4. The generator for producing superheated fuel gas set forth in claim 1 wherein said pressure vessel comprises three hollow bodied members in communication with one another and wherein said tubular member engages said three hollow body members and holds them in assembly.

5. The generator for producing superheated fuel gas set forth in claim 1 wherein said means balancing said diaphragm comprises three helical springs of different tensions and diameters.

6. The generator for producing superheated fuel gas set forth in claim 1 wherein said resistance heating means is arranged in a helical coil and wherein said means for injecting said gas and water comprises apertured tubular members extending into said helical coil.

7. The generator for producing superheated fuel gas set forth in claim 1 wherein a partition is positioned across said first chamber with said heating element on one side thereof and a perforated tubular member is positioned in said first chamber on the other side of said partition and communicates with the opposite said partition.

8. The generator for producing superheated fuel gas set forth in claim 7 wherein a steel wool filter is positioned between said perforated tubular member and said apertured tubular member.

9. The generator for producing superheated fuel gas set forth in claim 1 wherein said second chamber has a smaller internal area than said first and third chambers.

* * * * *